Feb. 26, 1957     W. A. GRANT ET AL     2,783,157
PROCESS OF MAKING CONCRETE
Filed June 1, 1953     2 Sheets—Sheet 1
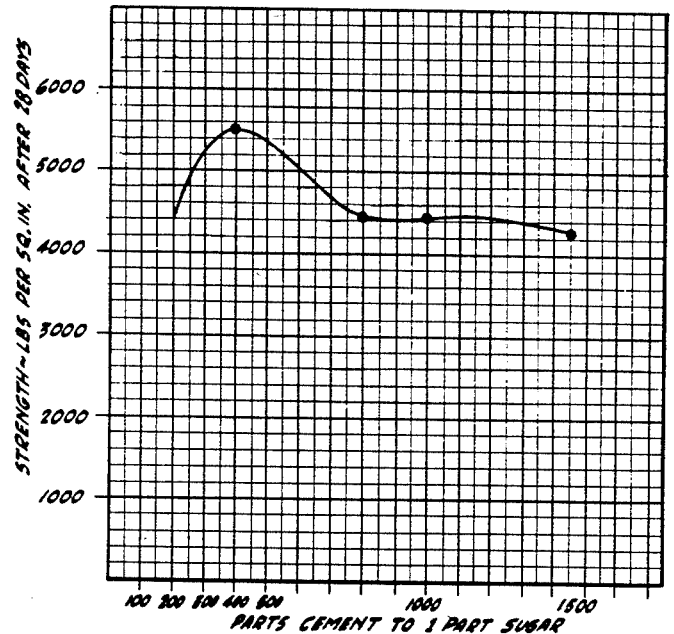
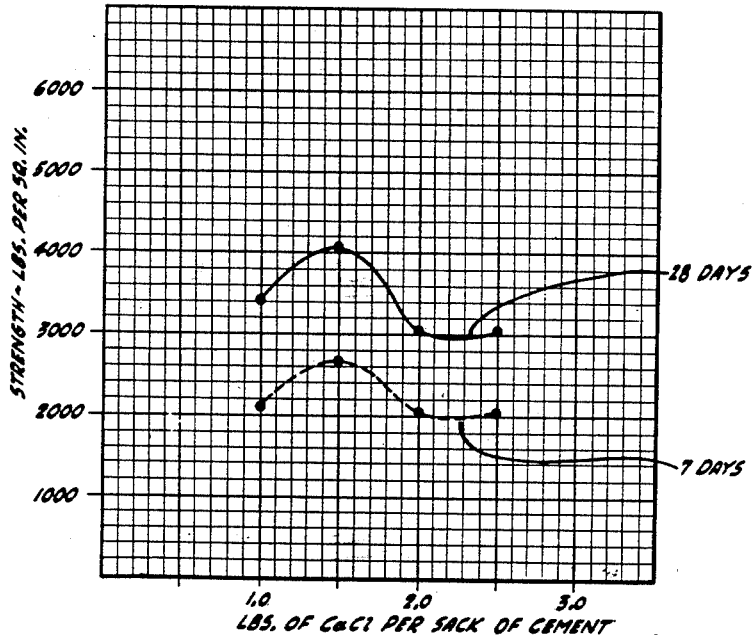
INVENTORS
WALLACE A. GRANT
CLARENCE J. AINSWORTH
BY
Mellin and Hanscom
ATTORNEYS Feb. 26, 1957   W. A. GRANT ET AL   2,783,157
PROCESS OF MAKING CONCRETE
Filed June 1, 1953   2 Sheets-Sheet 2
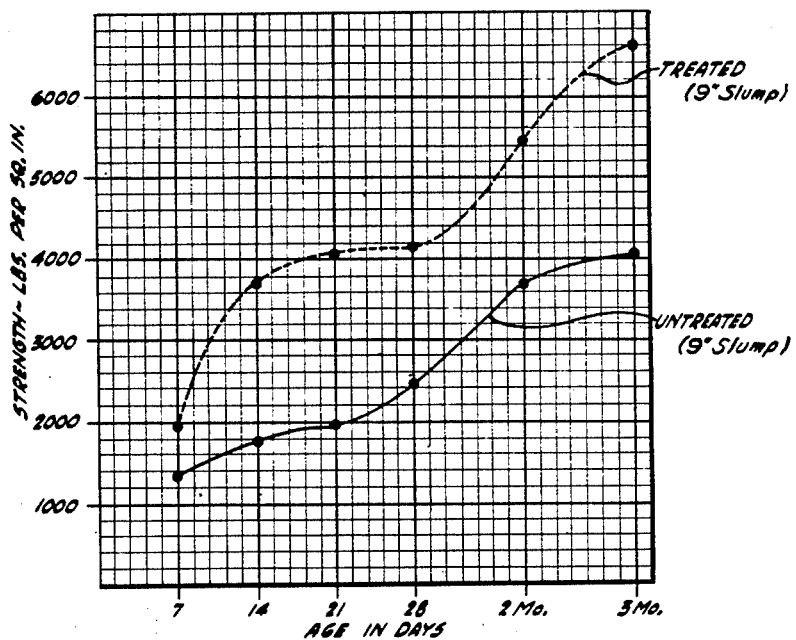
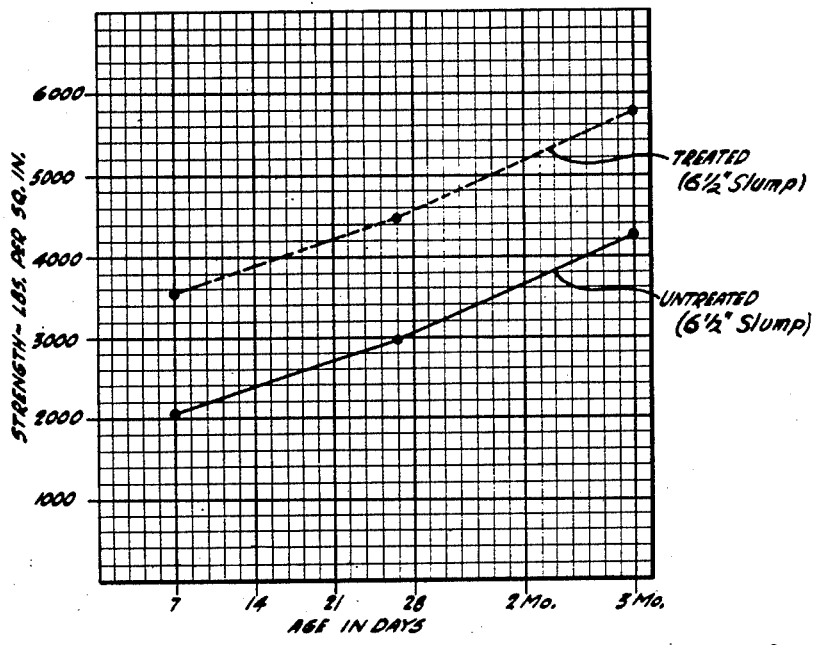
INVENTORS
WALLACE A. GRANT
CLARENCE J. AINSWORTH
BY
Mellin and Hanscom
Attorneys United States Patent Office 2,783,157
Patented Feb. 26, 1957

2,783,157

PROCESS OF MAKING CONCRETE

Wallace A. Grant, Burlingame, and Clarence J. Ainsworth, Millbrae, Calif.

Application June 1, 1953, Serial No. 358,728

1 Claim. (Cl. 106—92)

Our invention relates to methods of mixing and treating cement and aggregate for making concrete.

Experience has indicated that when cement, water and aggregate are mixed by the methods commonly employed in present day practice to produce concrete, the character of the concrete and its compressive and tensile strength varies widely in accordance with variations in a number of different factors. Substantial variations occur even in batches of concrete mixed as nearly alike as practicably possible. For example, numerous tests have proved that one mixture will sometimes produce a concrete having strength two or three or more times greater than other mixtures of substantially the same composition subjected to substantially the same mixing operations. The irregularities of products, and the occasional production of batches having strength greatly exceeding that of the average batch, have proved that cement and concrete mixtures, as ordinarily mixed and treated, do not produce the full strength which the materials are capable of producing. Variations have been found to result from numerous factors, including the composition of the cement and of the aggregate, the methods used in mixing the materials, the character and amounts of materials used for retarding or accelerating the setting action, and similar factors.

Experiments conducted with a wide range of materials, variously treated during the mixing and setting periods, have resulted in applicants' discovery that the wide variation in strength heretofore encountered in the mixing and pouring of concrete has been due to variation in the degree, uniformity and effectiveness of the hydration of the cement. In many cases, an initial set occurs before the cement becomes uniformly hydrated, and only a portion of the cement is effective. Not only is a substantial amount of the potential strength and effectiveness of the cement lost by incomplete reaction, but the irregularity of the hydration throughout the mass causes the development of internal stresses such as to seriously reduce the ultimate strength of the concrete and to cause cracks which should not occur. The objectionable effects of a too quick setting of a portion of the concrete also appear in the excessive "drag," which sometimes impairs the flow and settling of poured concrete. Excessive shrinkage also is caused.

The method of the present invention has been devised to provide a treatment which will obviate some of the causes for irregularities and weaknesses which have heretofore been characteristic to the commercial mixing and pouring of concrete.

It is among the objects of the present invention to provide a method of preparing concrete which will materially increase its strength.

Another object is to provide a method which will insure substantially uniform and complete hydration of cement during the mixing process, with correspondingly increased effective strength and lessened internal stress.

It is also an object to provide a method of making concrete wherein cement and water are mixed and maintained in a slurry of fluidity suitable for mixing with aggregate after complete hydration of the cement is assured, and thereafter controlling the rate of setting to conform to practical requirements.

In terms of broad inclusion, the method of the present invention comprises the mixing of cement with enough water to make a slurry of the desired fluidity and introducing into the fluid mixture an agent, such as sugar, having the property of substantially suspending the setting action of the cement while the cement is effectively hydrated. Thereafter, the slurry is mixed with aggregate in the presence of an agent, such as calcium chloride, having the property of restoring the setting action, thereby producing a concrete in which the cement is substantially completely hydrated uniformly throughout the mass. The aggregate so treated sets without material internal stress, and has strength greatly exceeding the strength of concrete mixed by methods such as heretofore commonly employed.

In terms of greater detail, the method of our invention comprises mixing a hydraulic cement, such as Portland cement, with water to produce a slurry of a desired fluidity. To the slurry is added a material having the property of suspending the setting action of the cement for a prolonged period, which may range from about ten or twelve hours to a period of several days. For that purpose, we prefer to use sugar, added to the slurry in dry refined form, or in solution, or as partially-refined syrup or molasses.

The amount of sugar added to the slurry varies with different grades and kinds of cement and the length of the period for which it is desired to suspend the setting action. For a good quality Portland cement to be used in making concrete for pouring in large masses, we have found that the addition of about 1 part by weight of sugar to 400 parts of cement gives excellent results. This amount of sugar seems to substantially inhibit setting of the cement for an indefinite period, amounting at least to several days and probably to several weeks.

The slurry contains water in excess of the amount required for the hydration of the cement. During the period while the setting action is suspended, the cement is uniformly exposed to the action of the water, and becomes thoroughly saturated.

We prefer to allow the slurry to stand for a period of about 18 to 24 hours with the setting action held in suspension. During that time, most, if not all, of the heat of reaction is dissipated, and sufficient water is taken up by the cement physically and chemically to insure complete hydration of all the cement in the final concrete product. The water taken up during this step in the method tends to reduce the drag, and is reflected by an increase in the weight of the concrete. Thus, where an ordinary concrete weighs 150 pounds per cubic foot, concrete produced by the method of the present invention weighs from 152 to 153 pounds. This increase in weight appears to be due to an increase in the effective hydration of the cement and a closer packing of the particles, producing a product of greater density. The amount of cement fully hydrated by the additional water which is taken up, and which cement presumably remains unhydrated in concrete made by ordinary methods, supplies an increase in ultimate strength which characterizes concrete made by the method of our invention.

After standing for the desired period, the slurry is mixed with aggregate to make a concrete mixture of desired composition. The amount of water required for the intended concrete mixture is preferably added to the initially prepared slurry, but additional water may be introduced with the aggregate if desired. Any available apparatus may be used for mixing the slurry and aggregate.

To the mixture of slurry and aggregate is added an agent having the property of counteracting the action of the sugar, and restoring to the mixture the property of setting. For that purpose we prefer to use calcium chloride, added either in its crystalline form or in solution. We have found that the addition of about 6½ parts of calcium chloride to a mixture containing 400 parts of cement and one part of sugar (about 1½ pounds per sack of cement) is best for practical purposes. The concrete mixture, including the calcium chloride, is mixed and poured in accordance with ordinary practice.

The rate at which the concrete sets, and the ultimate effective strength of the concrete, when set, vary somewhat with the character of the cement used and with the amounts of sugar and calcium chloride which are added. In our preferred commercial practice with sugar and calcium chloride added as above specified, we find that the initial setting action is satisfactory retarded. For a period of several hours after pouring, the concrete remains substantially unset. At the end of a period which appears to be directly related to the amounts of sugar and calcium chloride added, the mixture sets to a hardened condition in which it has strength approximating that of the ordinary commercial concrete product. As the concrete stands, its strength increases progressively to a maximum which is not reached until after a period of 28 days, and the strengthening continues indefinitely thereafter. Both the time element and the ultimate strength vary somewhat with the amount of sugar and calcium chloride added, and the composition of the cement itself.

In the accompanying drawings forming a part of the present specification,

Fig. 1 is a graph illustrating the effect of varying amounts of sugar on the strength of concrete after various periods of curing; and Fig. 2 is a graph similarly illustrating the effect of varying amounts of calcium chloride in a mixture containing the preferred amount of sugar.

Figs. 3 and 4 are graphs illustrating the comparative strength of test batches of concrete, one which was treated in accordance with the method of the present invention, and the other not.

It is not certain exactly what action takes place during the mixing and final setting of the concrete mixture as it is treated in accordance with our invention. However, it appears probable that, during the period while the setting action is retarded by the sugar, the cement is conditioned throughout its mass to complete its hydration after the concrete is poured, the excess of water present serving to promote the action and insure uniformity throughout the bulk of the slurry. Satisfactory results have been obtained where the action has been permitted to continue for about seventy-two hours; and it could probably be permitted to continue even longer, though it does not now appear that any material improvement will result. It does appear that coarser grades of cement require a longer period for hydration than the finer grades to produce concrete of the same ultimate strength. For commercial purposes, the slurry may be used with satisfactory results after about 20 to 24 hours. This permits the slurry to be prepared in the course of one day and evening for use during the following day. During that period the slurry becomes stabilized so that, when mixed with aggregate, it hardens uniformly throughout the mass, without apparent internal stress, and with very high compressive and tensile strength.

For example, ordinary concrete made by the methods commonly employed in commercial practice rarely has a compressive strength of more than about 3,000 pounds per square inch, even after it has cured for several months. Concrete made in accordance with our present invention consistently shows a compressive strength of between 4,000 and 5,000 pounds per square inch when tested after a 28 day period of curing. The strength increases for a considerably longer period, and many test samples have shown an ultimate compressive strength in the range of 7,000 to 7,500 pounds per square inch.

The rate of setting after the slurry is mixed with aggregate may vary between wide limits. While a slow setting appears to ultimately give greater strength, the rate must be conformed to practical requirements. In work which must be advanced from day to day, the poured concrete should become self-sustaining within a matter of a few hours, say overnight. To that end, the addition of calcium chloride or other suitable accelerator is regulated in conformity with the time elements which must be met, the slump desired at the time of pouring, and other factors materially affecting commercial practice.

In general, the ratio of about 1½ pounds of calcium chloride to about 94 pounds of cement is preferred. Ultimate strength after 28 days appears to be increased somewhat by slightly reducing the ratio and/or reducing the slump of the concrete. This causes the initial set to be retarded. Where timing is important to the progress of a project, a gain in setting time may warrant some sacrifice in ultimate strength. The proportion of one part of sugar and 6½ parts of calcium chloride to about 400 pounds of cement appears to be fairly critical for obtaining maximum ultimate strength of concrete. However, strength materially greater than that obtained by ordinary methods is obtainable, even though the ratio is varied considerably in order to satisfy other practical requirements.

Having thus described our invention, what we claim and desire to secure by Letters Patent is:

The method of preparing stabilized concrete which consists essentially of mixing with cement, a quantity of water exceeding the amount required to fully hydrate the cement and containing sufficient sugar to inhibit setting of the cement during the early phases of the hydration, and after hydration has advanced to an effective degree, introducing aggregate and a sufficient amount of calcium chloride to counteract the inhibiting effect of the sugar so that the cement will harden during final phases of the hydration, the ratio of sugar, calcium chloride and cement used being in the order of one part by weight of sugar, 6½ parts by weight of calcium chloride, and 400 parts by weight of cement.

References Cited in the file of this patent

UNITED STATES PATENTS

| | | |
|---|---|---|
| 2,418,431 | Scripture | Apr. 1, 1947 |
| 2,434,695 | Helms | June 20, 1948 |

FOREIGN PATENTS

| | | |
|---|---|---|
| 113,785 | Great Britain | Oct. 3, 1918 |
| 436,105 | Great Britain | Oct. 4, 1935 |

OTHER REFERENCES

Pages 190 and 191 of the book entitled "Chemistry of Cement and Concrete," by Lea & Desch, publ. by Ed. Arnold & Co., London (1935).